US012753740B2

(12) United States Patent
Liu et al.

(10) Patent No.: US 12,753,740 B2
(45) Date of Patent: Oct. 6, 2026

(54) MUD FLOATING TYPE OFFSHORE WIND TURBINE SYSTEM AND INSTALLATION METHOD THEREOF

(71) Applicants: CHINA POWER ENGINEERING CONSULTING GROUP CO., LTD., Beijing (CN); SHANGHAI EST OCEAN ENGINEERING TECHNOLOGY CO., LTD., Shanghai (CN); Puyang Zhang, Tianjin (CN); Hongyan Ding, Tianjin (CN)

(72) Inventors: Bo Liu, Guangzhou (CN); Puyang Zhang, Tianjin (CN); Conghuan Le, Tianjin (CN); Gang Li, Guangzhou (CN); Hongyan Ding, Tianjin (CN); Hong Qiao, Guangzhou (CN)

(73) Assignees: CHINA POWER ENGINEERING CONSULTING GROUP CO., LTD., Beijing (CN); SHANGHAI EST OCEAN ENGINEERING TECHNOLOGY CO, LTD., Shanghai (CN); Puyang Zhang, Tianjin (CN); Hongyan Ding, Tianjin (CN)

( * ) Notice: Subject to any disclaimer, the term of this patent is extended or adjusted under 35 U.S.C. 154(b) by 209 days.

(21) Appl. No.: 18/895,996

(22) Filed: Sep. 25, 2024

(65) Prior Publication Data

US 2025/0116256 A1 Apr. 10, 2025

(30) Foreign Application Priority Data

Oct. 9, 2023 (CN) ......................... 202311303308.9

(51) Int. Cl.

| | |
|---|---|
| ***B63B 21/50*** | (2006.01) |
| ***B63B 35/44*** | (2006.01) |
| ***F03D 13/25*** | (2016.01) |

(52) U.S. Cl.

CPC ............ *F03D 13/256* (2023.08); *B63B 21/50* (2013.01); *B63B 35/44* (2013.01);

(Continued)

(58) Field of Classification Search

CPC ....... F03D 13/25; F03D 13/256; B63B 21/00; B63B 21/50; B63B 21/502; B63B 35/00; B63B 35/44

(Continued)

(56) References Cited

U.S. PATENT DOCUMENTS 8,118,538 B2 * 2/2012 Pao ......................... F03D 13/25 415/115
8,657,534 B2 * 2/2014 Jahnig ................... B63B 21/502 405/223.1

(Continued)

FOREIGN PATENT DOCUMENTS

WO WO-2015039483 A1 * 3/2015 ............. B63B 22/02

*Primary Examiner* — Lars A Olson

(57) ABSTRACT

The disclosure relates to a mud floating type offshore wind turbine system and an installation method thereof. The system includes a plurality of suction anchors, a plurality of gravity anchors, an upper wind turbine, a tower drum and a wind turbine foundation; the fan foundation includes a column body, a first spherical shell, a second spherical shell, a plurality of third spherical shells, first connecting rods, second connecting rods and supporting rods; each of the first spherical shell and the second spherical shell is internally provided with a winch with a plurality of telescopic anchor discs; each suction anchor and each gravity anchor are located beneath the corresponding third spherical shell and located on a side face of the corresponding third spherical shell respectively and used for restraining positions of the upper wind turbine in a vertical direction and a horizontal direction respectively.

13 Claims, 9 Drawing Sheets

(52) U.S. Cl.
CPC ..... *B63B 2035/446* (2013.01); *F05B 2240/93* (2013.01); *F05B 2240/95* (2013.01)

(58) Field of Classification Search
USPC .................... 114/230.1, 266; 405/223.1, 224
See application file for complete search history.

(56) References Cited

U.S. PATENT DOCUMENTS

| | | | | |
|---|---|---|---|---|
| 10,598,155 | B2 * | 3/2020 | Dagher | B63B 21/50 |
| 11,208,987 | B2 * | 12/2021 | Stiesdal | B63B 21/502 |
| 2007/0001464 | A1 * | 1/2007 | Kothnur | F03D 13/22 290/55 |

* cited by examiner

MUD FLOATING TYPE OFFSHORE WIND TURBINE SYSTEM AND INSTALLATION METHOD THEREOF

CROSS-REFERENCE TO RELATED APPLICATION

This application claims priority from the Chinese patent application 202311303308.9 filed Oct. 9, 2023, the content of which is incorporated herein in the entirety by reference.

TECHNICAL FIELD

The present disclosure relates to the technical field of offshore wind power, in particular to a mud floating type offshore wind turbine system and an installation method thereof.

BACKGROUND ART

With the increasingly prominent energy crisis, offshore wind power, as renewable energy, has become an important part of a current energy structure. In the related art, only one anchor structure is designed for an offshore wind turbine system to restrain a position of the wind turbine system in a vertical direction, without considering a position of the wind turbine system in a horizontal direction. Thus, when a marine environment is steady, the wind turbine system can operate steadily, but when the marine environment is harsh, the wind turbine system will skew when blown by wind and waves, horizontal displacement of the wind turbine system is too large, and even the wind turbine system may topple.

At present, it is urgent to provide a mud floating type offshore wind turbine system and an installation method thereof to solve the above technical problems.

SUMMARY OF THE PRESENT DISCLOSURE

One or more embodiments of the present disclosure describe a mud floating type offshore wind turbine system and an installation method thereof, which restrain displacement of the wind turbine system in a vertical direction as well as a horizontal direction, thus having high safety.

In a first aspect, an embodiment of the present disclosure provides a mud floating type offshore wind turbine system, comprising: a plurality of gravity anchors, a plurality of suction anchors, an upper wind turbine, a tower drum, a tower drum connector and a wind turbine foundation; wherein the upper wind turbine, the tower drum, the tower drum connector and the wind turbine foundation are sequentially connected in a vertical direction, the wind turbine foundation includes a hollow column body, a first spherical shell, a second spherical shell, a plurality of third spherical shells, a plurality of hollow first connecting rods, a plurality of second connecting rods and a plurality of hollow supporting rods;

one end of each first connecting rod is connected with a circumferential outer wall of the second spherical shell, the other end of each first connecting rod is connected with one third spherical shell, so that the plurality of third spherical shells uniformly surround a circumferential direction of the second spherical shell, and two ends of each second connecting rod are connected with every two adjacent third spherical shells respectively; one end of each supporting rod is connected with one third spherical shell, and the other end of each supporting rod is connected with a circumferential outer wall of the first spherical shell; each of the first spherical shell and the second spherical shell is internally provided with a winch with a plurality of telescopic anchor discs, each suction anchor is connected with one first anchor chain, and the other end of each first anchor chain penetrates through the corresponding third spherical shell and the corresponding supporting rod to be connected with the corresponding telescopic anchor disc in the first spherical shell; each gravity anchor is connected with one second anchor chain, and the other end of each second anchor chain penetrates through the corresponding third spherical shell and the corresponding first connecting rod to be connected with the corresponding telescopic anchor disc in the second spherical shell; and during operation, a length of each first anchor chain is adjusted by the corresponding winch, so as to restrain a displacement of the upper wind turbine in the vertical direction of the upper wind turbine, and a length of each second anchor chain is adjusted by the corresponding winch, so as to restrain a displacement of the upper wind turbine in a horizontal direction.

In a second aspect, an embodiment of the present disclosure provides an installation method of a mud floating type offshore wind turbine system, applied to the offshore wind turbine system in the above embodiment and including:

setting each first anchor chain and each second anchor chain in a relaxed state, and lowering each gravity anchor and each suction anchor to a designated position of the seabed based on a ship navigation and positioning system, wherein the designated position includes a designated depth and a designated longitude and latitude; and keeping a wind turbine foundation in a balanced state, and adjusting lengths of each anchor chain and each second anchor chain till an upper wind turbine reaches a designated working height.

According to the offshore wind turbine system and the installation method thereof provided by the embodiments of the present disclosure, in a first aspect, the plurality of suction anchors are arranged, each suction anchor is connected with one first anchor chain, and the other end of each first anchor chain penetrates through the corresponding third spherical shell and the corresponding supporting rod to be connected with the corresponding telescopic anchor disc in the first spherical shell. Since each suction anchor is located beneath the corresponding third spherical shell, the upper wind turbine can be adjusted to the designated height by adjusting the length of each first anchor chain. In addition, when each first anchor is adjusted to a tensioned state, the first anchor chain can restrain displacement of the upper wind turbine in the vertical direction, so that the upper wind turbine is prevented from disengaging from the seabed in a harsh environment. In a second aspect, the plurality of gravity anchors are arranged, each gravity anchor is connected with one second anchor chain, and the other end of each second anchor chain penetrates through the corresponding third spherical shell and the corresponding first connecting rod to be connected with the corresponding telescopic anchor disc in the second spherical shell. Since each gravity anchor is located on the side face of the corresponding third spherical shell, when adjusted to a tensioned state, each second anchor chain is used for restraining displacement of the upper wind turbine in the horizontal direction, so that the upper wind turbine is prevented from rolling over in the harsh environment. Thus, the present disclosure can restrain displacement of the wind turbine system in the vertical direction and the horizontal direction at the same time, so the present disclosure has high safety.

BRIEF DESCRIPTION OF THE DRAWINGS

In order to more clearly explain the embodiments of the present disclosure or the technical solutions of the prior art, the drawings needed in the description of the embodiments or the prior art will be briefly described below. Apparently, the drawings in the following description are some embodiments of the present disclosure. For those ordinarily skilled in the art, other drawings can be obtained in accordance with these drawings without involving any inventive effort.

REFERENCE NUMERALS

10: suction anchor;
20: gravity anchor;
30: upper wind turbine;
40: tower drum;
50: tower drum connector;
60: wind turbine foundation;
601: column body; 602: first spherical shell; 603: second spherical shell; 604: third spherical shell; 605: first connecting rod; 606: second connecting rod; 607: supporting rod; 608: first anchor chain; 609: second anchor chain; 610: first cabin; 611: second cabin;
70: first base;
80: second base; and
90: floater.

DETAILED DESCRIPTION OF THE EMBODIMENTS

In order to make the objectives, technical solutions and advantages of the embodiments of the present disclosure clearer, the technical solutions in the embodiments of the present disclosure will be clearly and completely described below with reference to the drawings in the embodiments of the present disclosure; and apparently, the described embodiments are merely part, rather than all of the embodiments of the present disclosure. All other embodiments obtained by those ordinarily skilled in the art without involving inventive effort based on the embodiments in the present disclosure fall within the scope of protection of the present disclosure.

In order to better understand the solutions, a mud floating type offshore wind turbine system is explained herein:

The mud floating type offshore wind turbine system may be switched between a floating state and a mud floating state, the floating state refers to that a wind turbine foundation floats on a sea surface or seawater, an upper wind turbine works at a high height in this state, which is beneficial to improving power generation efficiency, and it is suitable for a better marine environment; and the mud floating state refers to that the wind turbine foundation is fixed to a mud layer of the seabed, the upper wind turbine works at a low height in this state, which is conducive to improving safety, and it is suitable for a harsh marine environment.

Figure 1:
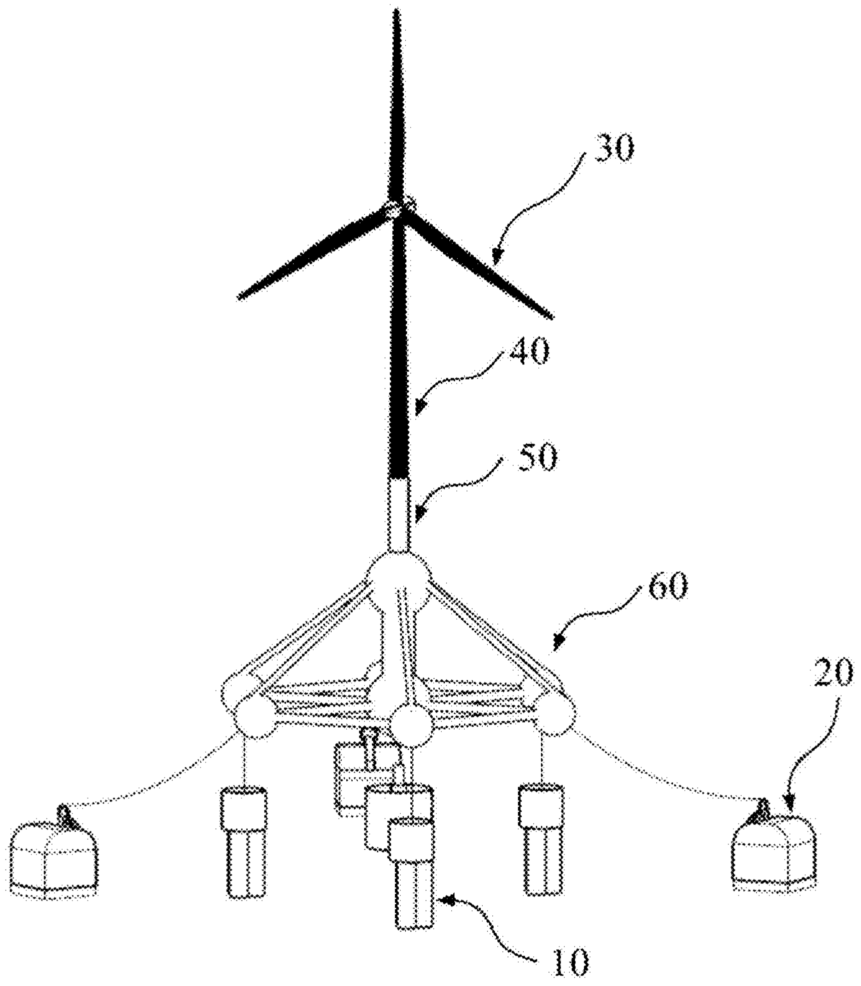
FIG. 1 is a stereoscopic structural schematic diagram of a mud floating type offshore wind turbine system provided by an embodiment of the present disclosure.
Figure 2:
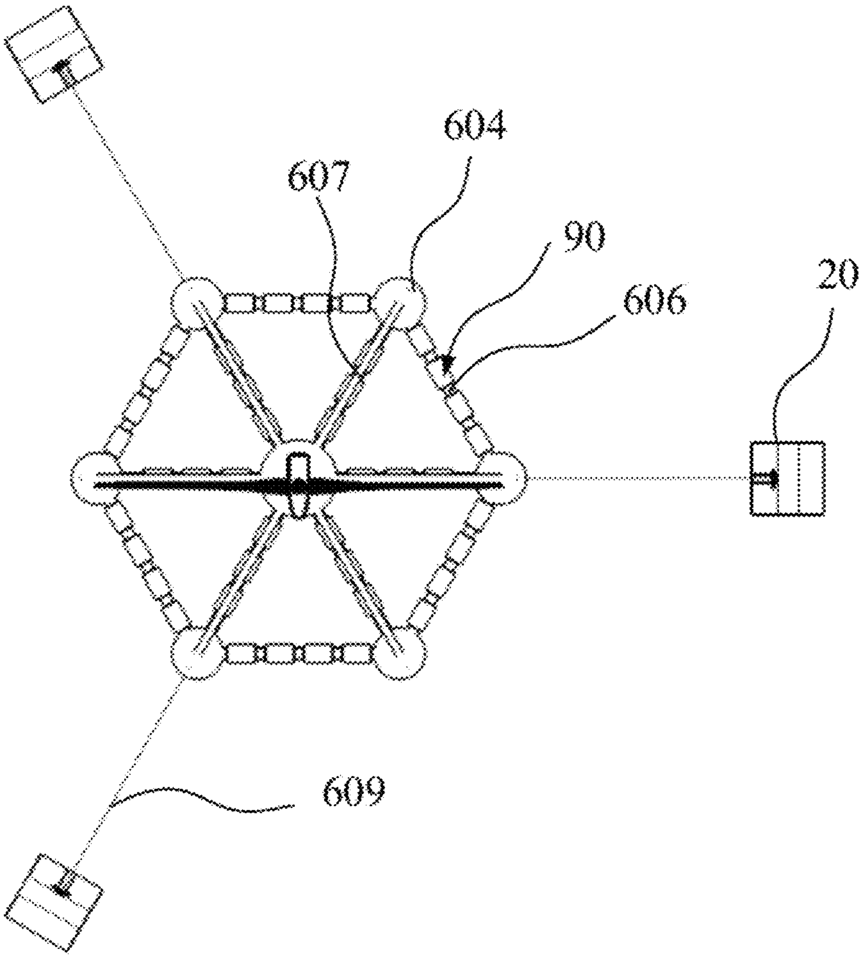
FIG. 2 is a top view of the mud floating type offshore wind turbine system provided by an embodiment of the present disclosure.
Figure 3:
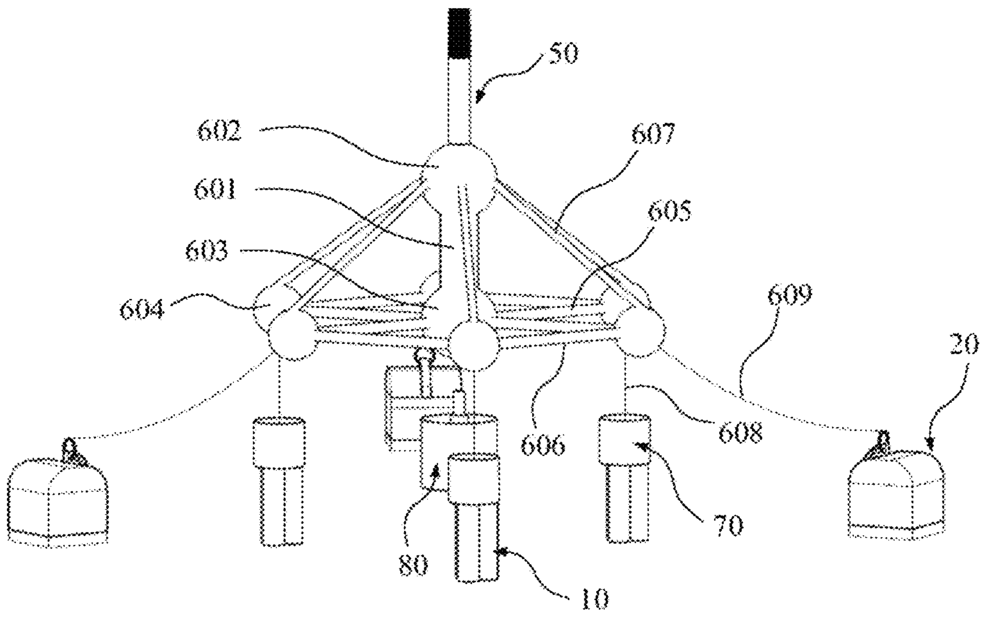
FIG. 3 is a structural schematic diagram of a wind turbine foundation provided by an embodiment of the present disclosure.

As shown in FIG. 1 to FIG. 3, an embodiment of the present disclosure provides a mud floating type offshore wind turbine system, including a plurality of suction anchors 10, a plurality of gravity anchors 20, an upper wind turbine 30, a tower drum 40, a tower drum connector 50 and a wind turbine foundation 60, wherein the upper wind turbine, the tower drum, the tower drum connector and the wind turbine foundation are sequentially connected in a vertical direction, the wind turbine foundation 60 includes a hollow column body 601, a first spherical shell 602, a second spherical shell 603, a plurality of third spherical shells 604, a plurality of hollow first connecting rods 605, a plurality of second connecting rods 606 and a plurality of hollow supporting rods 607;

one end of each first connecting rod 605 is connected with a circumferential outer wall of the second spherical shell 603, the other end of each first connecting rod is connected with one third spherical shell 604, so that the plurality of third spherical shells 604 uniformly surround a circumferential direction of the second spherical shell 603, and two ends of each second connecting rod 606 are connected with every two adjacent third spherical shells 604 respectively; one end of each supporting rod 607 is connected with one third spherical shell 604, and the other end of each supporting rod is connected with a circumferential outer wall of the first spherical shell 602; each of the first spherical shell 602 and the second spherical shell 603 is internally provided with a winch with a plurality of telescopic anchor discs, each suction anchor 10 is connected with one first anchor chain 608, and the other end of each first anchor chain 608 penetrates through the corresponding third spherical shell 604 and the corresponding supporting rod 607 to be connected with the corresponding telescopic anchor disc in the first spherical shell 602; each gravity anchor 20 is connected with one second anchor chain 609, and the other end of each second anchor chain 609 penetrates through the corresponding third spherical shell 604 and the corresponding first connecting rod 605 to be connected with the corresponding telescopic anchor disc in the second spherical shell 603;

each suction anchor 10 is located beneath the corresponding third spherical shell 604, and the first anchor chains 608 are used for restraining a displacement of the upper wind turbine 30 in the vertical direction in a tensioned state; and each gravity anchor 20 is located on a side face of the corresponding third spherical shell 604, and the second anchor chains 609 are used for restraining a displacement of the upper wind turbine 30 in a horizontal direction in a tensioned state.

In this embodiment, in a first aspect, the plurality of suction anchors 10 are arranged, each suction anchor 10 is connected with one first anchor chain 608, and the other end of each first anchor chain 608 penetrates through the corresponding third spherical shell 604 and the corresponding supporting rod 607 to be connected with the corresponding telescopic anchor disc in the first spherical shell 602. Since each suction anchor 10 is located beneath the corresponding third spherical shell 604, the upper wind turbine 30 can be adjusted to a designated height by adjusting a length of each first anchor chain 608. In addition, when each first anchor chain 608 is adjusted to a tensioned state, the first anchor chain 608 can restrain displacement of the upper wind turbine 30 in the vertical direction, so that the upper wind turbine is prevented from disengaging from the seabed in a harsh environment. In a second aspect, the plurality of gravity anchors 20 are arranged, each gravity anchor 20 is connected with one second anchor chain 609, and the other end of each second anchor chain 609 penetrates through the corresponding third spherical shell 604 and the corresponding first connecting rod 605 to be connected with the corresponding telescopic anchor disc in the second spherical shell 603. Since each gravity anchor 20 is located on the side face of the corresponding third spherical shell 604, when each second anchor chain 609 is adjusted to a tensioned state, each second anchor chain 609 is used for restraining displacement of the upper wind turbine 30 in the horizontal direction, so that the upper wind turbine is prevented from rolling over in the harsh environment. It can be shown that the present disclosure can restrain displacements of the wind turbine system in the vertical direction and the horizontal direction at the same time, so that safety is high.

Figure 6:
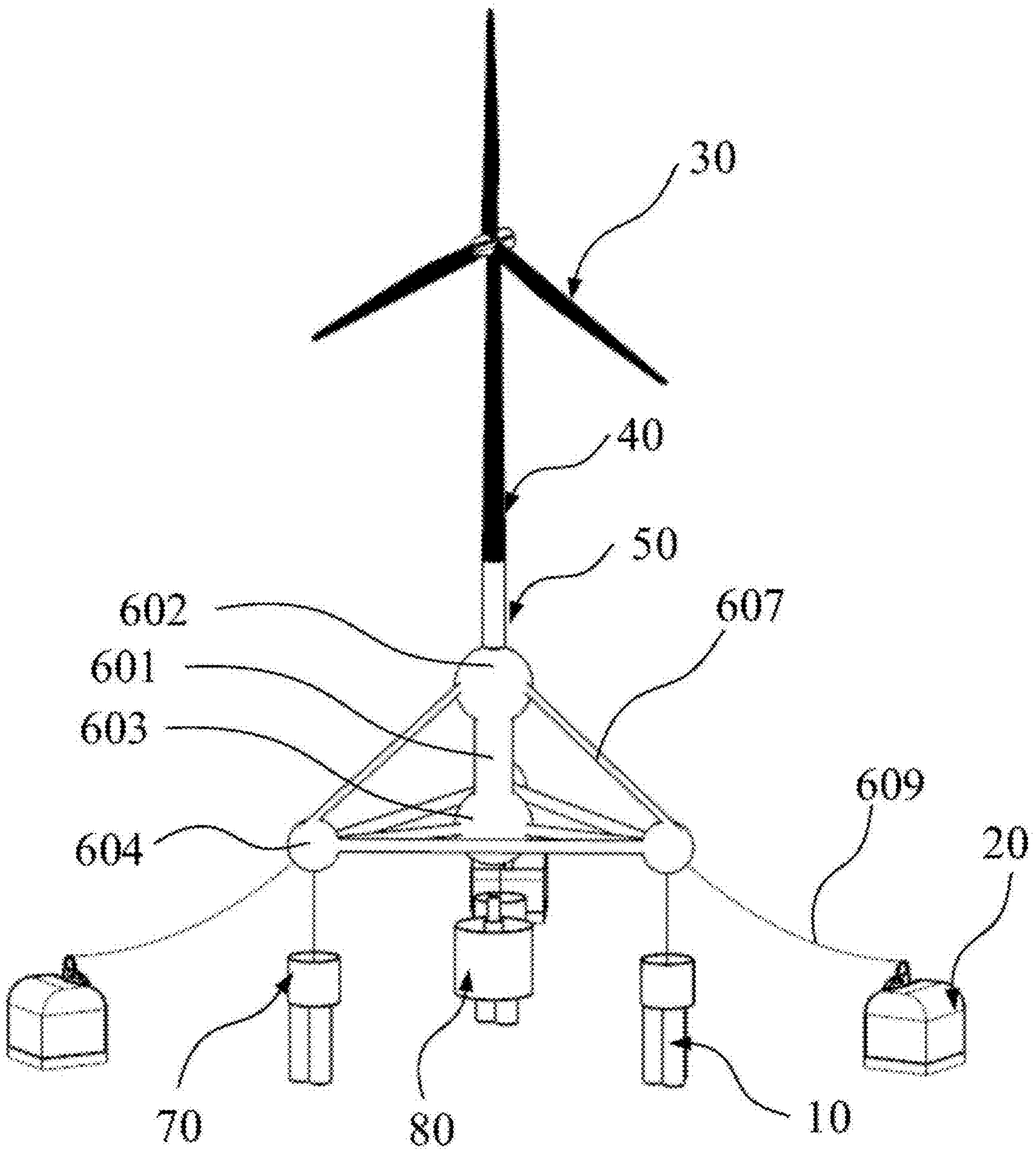
FIG. 6 is a stereoscopic structural schematic diagram of a mud floating type offshore wind turbine system provided by another embodiment of the present disclosure.
Figure 7:
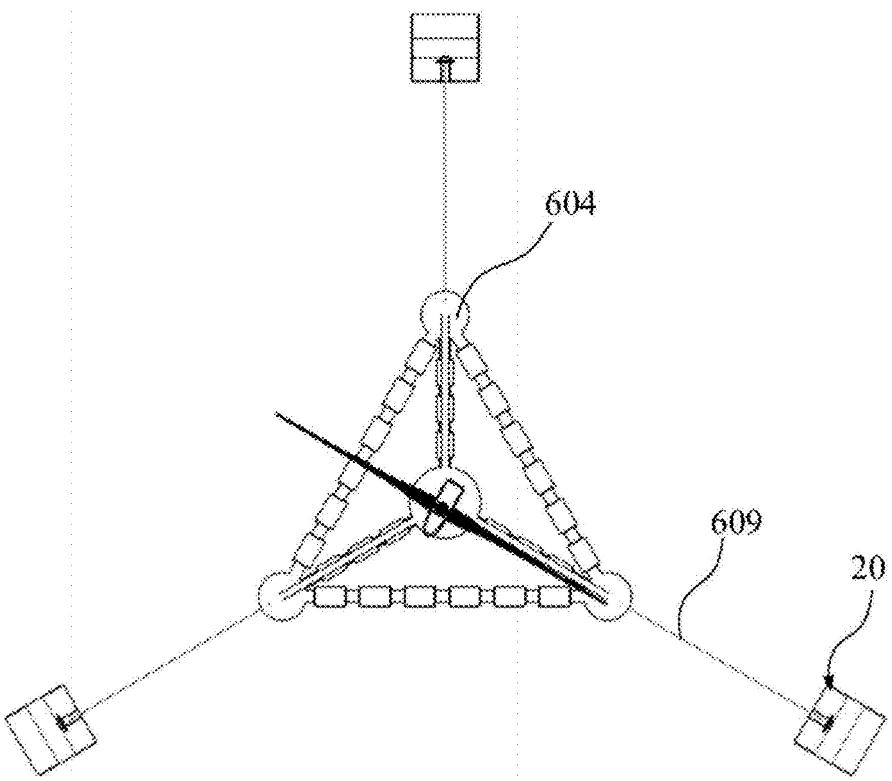
FIG. 7 is a top view of the mud floating type offshore wind turbine system provided by another embodiment of the present disclosure.

It is to be noted that when the wind turbine foundation 60 is in a balanced state, a sphere center of the second spherical shell 603, a sphere center of each third spherical shell 604 and a sphere center of each first connecting rod 605 are located in the same horizontal plane, and a distance between the sphere center of each third spherical shell 604 and the sphere center of the second spherical shell 603 is equal. In addition, the quantity of the suction anchors 10, the quantity of the gravity anchors 20 and the quantity of the third spherical shells 604 are not specifically limited in the present disclosure, which may be selected as 3, 6, 8 or another value according to requirements. When three gravity anchors 20, three suction anchors 10 and three third spherical shells 604 are selected, a structural diagram of the wind turbine system is shown in FIG. 6 and FIG. 7. In addition, the first connecting rods 605, the second connecting rods 606 and the supporting rods 607 are preferably hollow round tubes, which can improve buoyancy of the wind turbine foundation while ensuring strength.

In addition, in order to further improve the buoyancy of the wind turbine system, as shown in FIG. 1 and FIG. 6, the first connecting rods 605 and the second connecting rods 606 may further be sleeved with a plurality of floaters 90. Wherein the floaters 90 are preferably arranged on the second connecting rods 606, which can improve stability and is conducive to cleaning and inspection while providing the buoyancy for a structure. When additional buoyancy is required, the first connecting rods 605 are sleeved with floaters 90. After the floaters 90 are arranged in a sleeving manner, overall buoyancy of the wind turbine foundation 60 is: buoyancy of the single third spherical shell 604*the quantity of the third spherical shells 604*buoyancy of the single floater 90*the quantity of the floaters 90.

Figure 4:
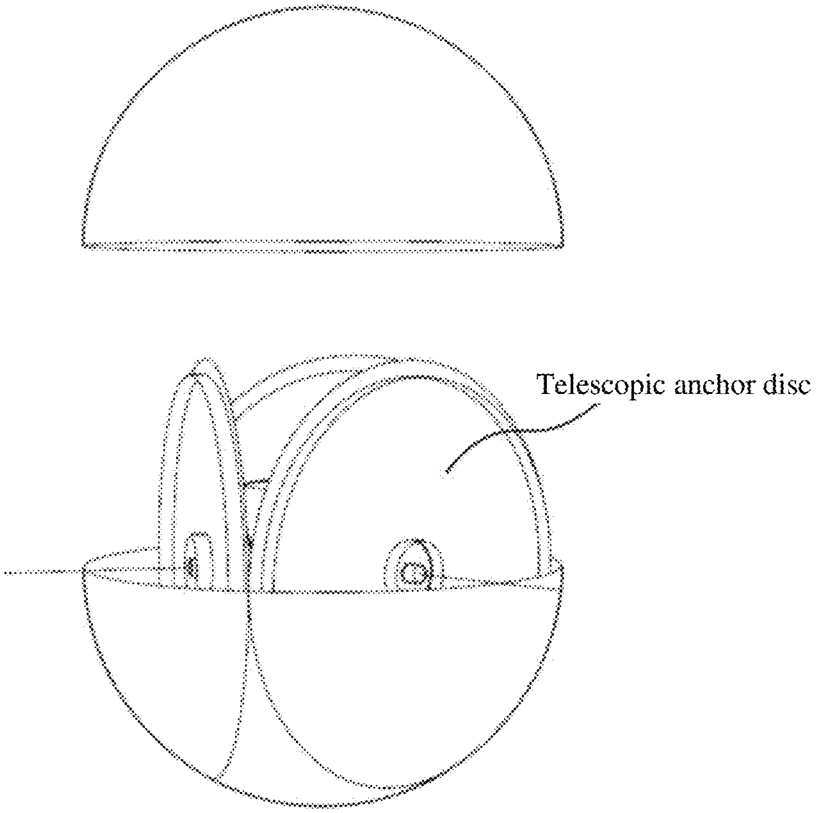
FIG. 4 is a structural schematic diagram of a telescopic anchor disc provided by an embodiment of the present disclosure.

As shown in FIG. 4, the plurality of telescopic anchor discs share one winch, so that each anchor chain has the same retractable speed when lengths of the anchor chains are adjusted by the winches. In addition, as shown in FIG. 1, the wind turbine system further may include a cylindrical second base 80, the second base 80 is fixed into a mud bed of the seabed, a semi-spherical groove is formed on a top end of the second base 80, a guiding rod is arranged at a center of the groove, and a guiding hole is formed in a bottom end of the second spherical shell 603. When the wind turbine system is in the mud floating state, as shown in FIG. 9, the guiding rod is inserted into the guiding hole, the second spherical shell 603 is located in the groove of the second base 80, so as to restrain horizontal displacement of the wind turbine foundation 60.

Figure 8:
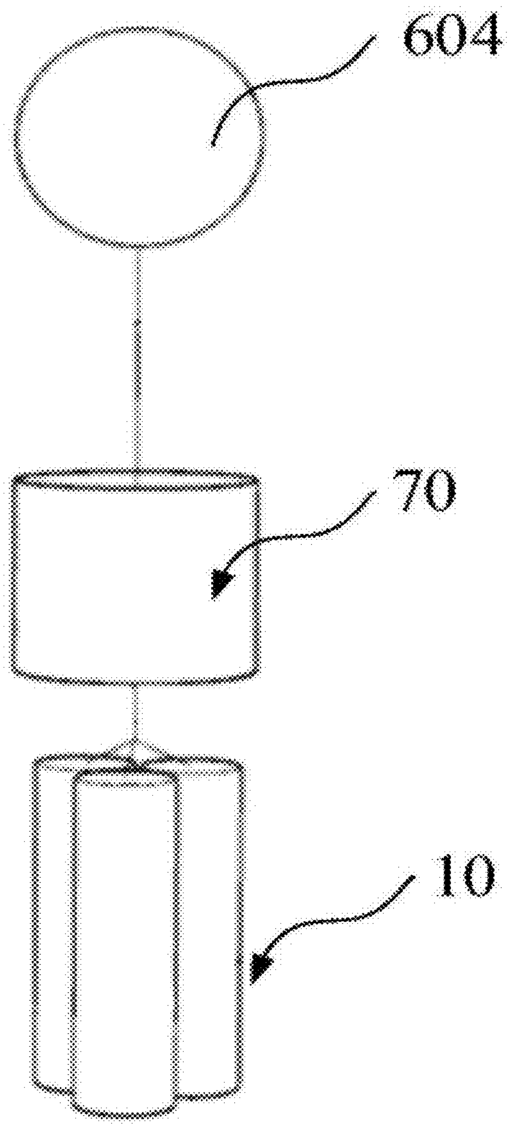
FIG. 8 is a structural schematic diagram of a suction anchor provided by an embodiment of the present disclosure.

In some implementations, as shown in FIG. 8, each suction anchor 10 comprises a plurality of suction drums, and outer walls of the adjacent suction drums are mutually connected in an axial direction of a connection line of the center of the third spherical shell (604), the corresponding cylindrical first base (70) and the corresponding suction anchor (10). By arranging the plurality of suction drums, friction force between the suction anchors 10 and the mud bed can be increased, thereby improving stability of the wind turbine system.

In some implementations, as shown in FIG. 8, the system further includes a plurality of cylindrical first bases 70, a semi-spherical groove is formed on a top end of each first base 70, an internal diameter of the groove is equal to an external diameter of the third spherical shell 604 so that the third spherical shell 604 can be accommodated in the groove, a through hole is formed in a bottom center of the groove, and the through hole is used for allowing the first anchor chain 608 on the suction anchor 10 to pass.

Figure 9:
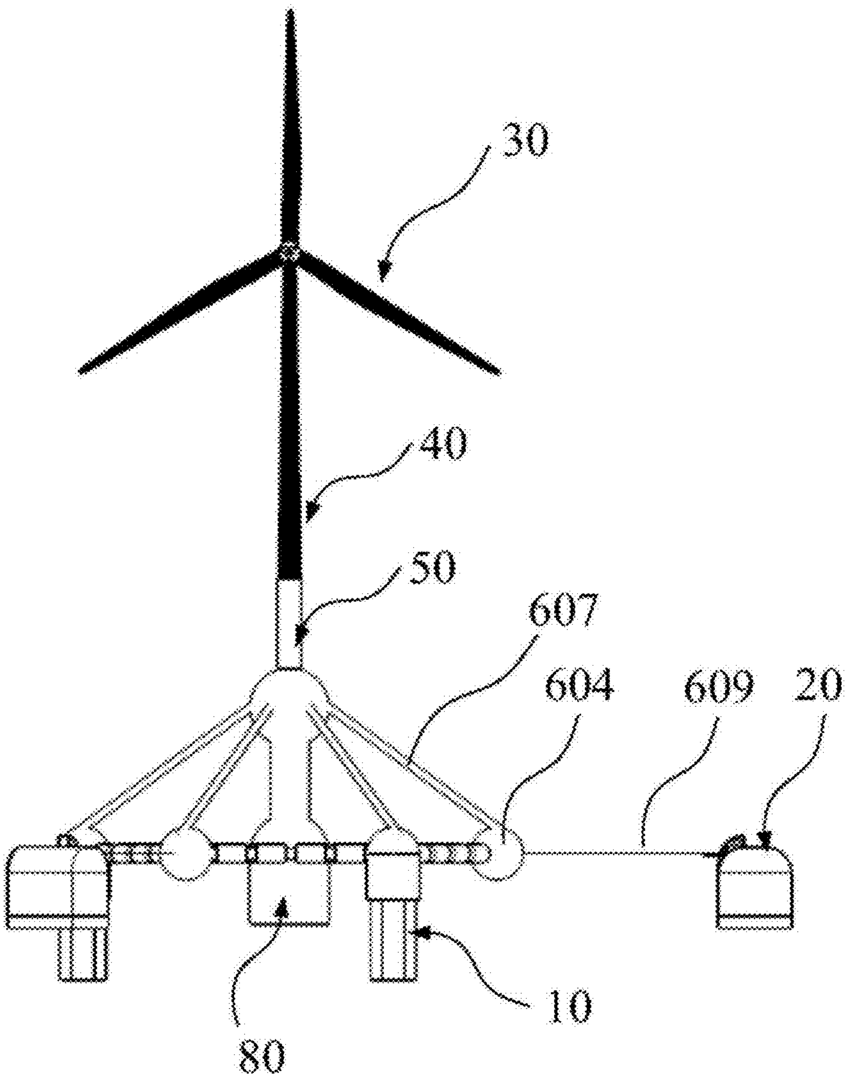
FIG. 9 is a schematic diagram of the wind turbine system shown in FIG. 1 in a mud floating state.

In this embodiment the first bases 70 are arranged, when the wind turbine system is in the mud floating state, as shown in FIG. 9, top ends of the suction anchors 10 are sleeved with bottom ends of the first bases 70, and bottom ends of the third spherical shells are located in the grooves of the first bases 70, which can further restrain the displacement of the wind turbine foundation 60 in the horizontal direction, thereby improving the stability of the wind turbine system.

Figure 5:
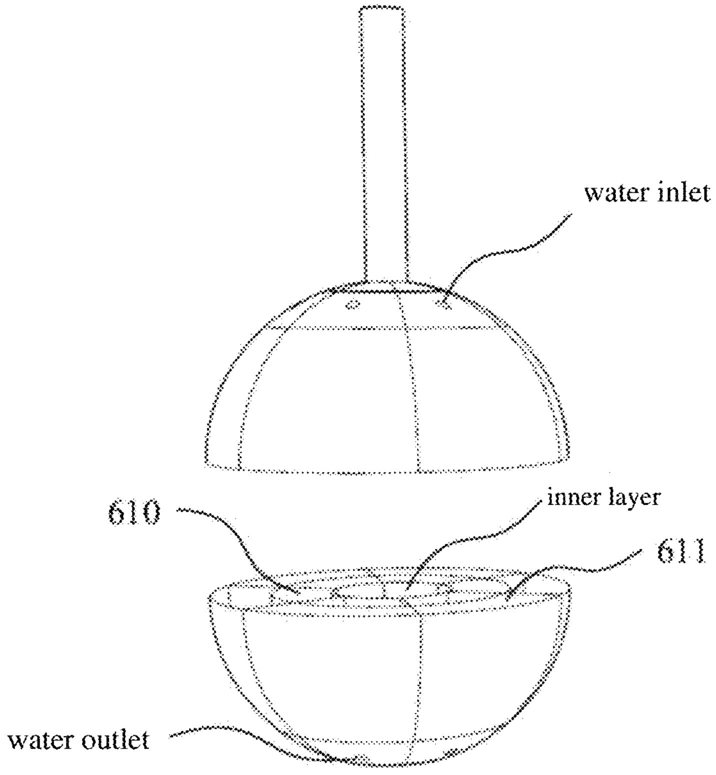
FIG. 5 is an internal structural schematic diagram of a third spherical shell provided by an embodiment of the present disclosure.

In some implementations, as shown in FIG. 5, each third spherical shell 604 includes an inner layer, a middle layer and an outer layer, all of which are sequentially and coaxially arranged from inside to outside, the inner layer is used for penetrating the first anchor chain 608 or the second anchor chain 609, the middle layer includes a plurality of first cabins 610 uniformly distributed in a circumferential direction, and a water inlet and a water outlet are formed in a top end and a bottom end of each first cabin 610 respectively; and the outer layer includes a plurality of second cabins 611 uniformly distributed in a circumferential direction, and a gas-water displacement valve is arranged in each second cabin 611.

In this embodiment, the inner layer, the middle layer and the outer layer are not communicated. Wherein the inner layer acts as an anchor chain passageway, and the middle layer is a sludge scouring layer used for scouring sludge in the groove of the first base 70, and the sludge can be completely scoured by arranging the plurality of first cabins 610, so that the third spherical shell 604 can better abut against the groove of the first base 70, thereby ensuring the stability of the wind turbine system. The outer layer is a ballast tank, when water is charged to the outer layer through the gas-water displacement valve, ballast of the outer layer increases, and the third spherical shell 604 sinks; when water is discharged from the outer layer through the gas-water displacement valve, the ballast of the outer layer decreases, and the third spherical shell 604 floats; and thus, balance of the wind turbine foundation 60 can be kept by adjusting the ballast of each third spherical shell 604. In addition, by arranging the plurality of second cabins 611, ballast of each second cabin 611 is adjusted independently, and the adjusting process can be more accurate, thereby further improving the stability of the wind turbine system.

In addition, a skirt plate is arranged at a bottom end of each gravity anchor 20, and the gravity anchor 20 can be sinked to a deeper position of the mud bed through the skirt plate, thereby improving the stability of the wind turbine system.

Figure 10:
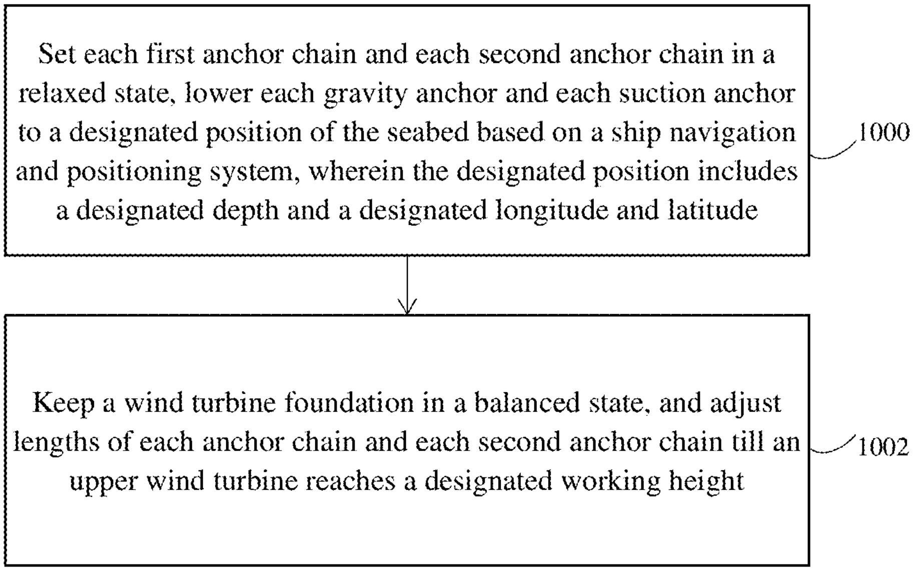
FIG. 10 is a flowchart of an installation method of a mud floating type offshore wind turbine system provided by another embodiment of the present disclosure.

As shown in FIG. 10, an embodiment of the present disclosure provides an installation method of a mud floating type offshore wind turbine system, applied to the offshore wind turbine system in the above embodiment and including:

step 1000, setting each first anchor chain 608 and each second anchor chain 609 are in a relaxed state, and lowering each gravity anchor 20 and each suction anchor 10 to a designated position of the seabed based on a ship navigation and positioning system, wherein the designated position includes a designated depth and a designated longitude and latitude; and step 1002, keeping a wind turbine foundation 60 in a balanced state, and adjusting lengths of each anchor chain 608 and each second anchor chain 609 till an upper wind turbine 30 reaches a designated working height.

The method provided by this embodiment is applied to the offshore wind turbine system, and balance capacity of the wind turbine system can be improved by uniformly arranging the plurality of third spherical shells 604 along the circumferential direction of the second spherical shell 603. Thus, when the wind turbine system is installed, the gravity anchors 20 and the suction anchors 10 may be installed firstly, and the upper wind turbine 30 may reach the designated working height only by adjusting the lengths of the anchor chains after the gravity anchors 20 and the suction anchors 10 are installed in place, thereby completing overall installation of the wind turbine system. Specifically, the wind turbine foundation 60 requires to be kept in the balanced state in the process of adjusting the anchor chains, so that the wind turbine system is prevented from toppling, thereby ensuring safety of the installation process. According to the installation method, the wind turbine system can be overall mounted by installing the gravity anchors 20 and the suction anchors 10 based on the ship navigation and positioning system, then keeping the wind turbine foundation 60 in the balanced state, and continuously adjusting the lengths of the anchor chains, and the installation process is simple and high in efficiency.

In some implementations, as for step 1002, the step of keeping a wind turbine foundation 60 in a balanced state, includes:

Acquiring an inclination angle of the wind turbine foundation 60 every first time interval; and judging whether the inclination angle is greater than a preset angle, if yes, performing follows: adjusting an opening degree of a gas-water displacement valve on each third spherical shell 604 so as to keep the wind turbine foundation 60 in a steady state, wherein the opening degree of each gas-water displacement valve and a water charging and discharging rate of the corresponding third spherical shell 604 are in a directly proportional relationship.

In this embodiment, the first time interval may be determined according to a marine environment, when the marine environment is harsh, the time interval is set as a smaller value, and otherwise it is set as a larger value, for example, the first time interval may be set as 5 seconds. Since the overall wind turbine and the wind turbine foundation 60 are as a whole, and the whole is a rigid part, the measured inclination angle of the wind turbine foundation 60 is the inclination angle of the whole. In addition, the preset inclination angle may be 5°, the target inclination angle being greater than 5° indicates that the wind turbine system inclines greatly, and is prone to toppling, so it is necessary to adjust the ballast of each third spherical shell 604 to straighten the wind turbine foundation 60, thereby ensuring normal installation of the wind turbine foundation 60. It is to be noted that after the gas-water displacement valve is turned on, water can be charged to or discharged from the corresponding third spherical shell 604 through a water pump. The larger the opening degree of the valve, the higher the water charging and discharging rate, and the higher the ballast adjusting speed.

In some implementations, the step of adjusting an opening degree of a gas-water displacement valve on each third spherical shell 604, includes:

For each third spherical shell 604 on the side tilted upward, increasing the opening degree of the gas-water displacement valve on each third spherical shell 604 where located on an upwards-inclined side, wherein the opening degree of the gas-water displacement valve on the third spherical shell 604 located in a middle location is the maximum, and the opening degree of the gas-water displacement valve on each third spherical shell 604 is gradually decreased in a direction away from the third spherical shell 604 located in the middle location; and a water charging rate of the corresponding third spherical shell 604 is increased by increasing the opening degree of the gas-water displacement valve.

In this embodiment, when the wind turbine foundation 60 inclines, the wind turbine foundation 60 is subjected to single-side adjustment, that is, only the ballast of each third spherical shell 604 on the upwards-inclined side is adjusted without adjusting the ballast of each third spherical shell 604 on the downwards-inclined side, thereby ensuring the stability of the adjusting process. In addition, by increasing the opening degree of the gas-water displacement valve of each third spherical shell 604, the water charging rate of the corresponding third spherical shell 604 can be increased, so as to increase the ballast thereof, thus straightening the wind turbine foundation 60. The opening degrees of the gas-water displacement valves of all the third spherical shells 604 are different, and the leveling rate and stability of the wind turbine foundation 60 can be improved.

It is further to be noted that when the wind turbine foundation 60 is in the balanced state, an axis of each first connecting rod 605, a sphere center of the second spherical shell 603 and a sphere center of each third spherical shell 604 are located on the same horizontal plane. As for any moment, the horizontal plane where the center of each third spherical shell 604 is located in the balanced state of the wind turbine system is used as a reference plane, the third spherical shells 604 with sphere centers above the reference plane are determined as the third spherical shells 604 inclining upwards, and the third spherical shells 604 with sphere centers below the reference plane are determined as the third spherical shells 604 inclining downwards.

In some implementations, the step of adjusting an opening degree of a gas-water displacement valve on each third spherical shell 604, further includes:

Each third spherical shell 604 on the side tilted downward, increasing the opening degree of the gas-water displacement valve on each third spherical shell 604 where located on a downwards-inclined side, wherein the opening degree of the gas-water displacement valve on the third spherical shell 604 located in a middle is the maximum, and the opening degree of the gas-water displacement valve on each third spherical shell 604 is gradually decreased in a direction away from the third spherical shell 604 located in the middle location; and a water discharging rate of the corresponding third spherical shell 604 is increased by increasing the opening degree of the gas-water displacement valve.

This embodiment is specific to the situation where the wind turbine system has large inclination angle and high risk of rollover. At this moment, the wind turbine foundation 60 is subjected to bilateral adjustment, that is, the ballast of the third spherical shells 604 on the upwards-inclined side and the downwards-inclined side is adjusted at the same time; on one hand, the ballast of the third spherical shells 604 on the upwards-inclined side is increased, and on the other hand, the ballast of the third spherical shells 604 on the downwards-inclined side is decreased, thereby accelerating balance adjustment. At this moment, the change of the inclination angle requires to be closely detected, so as to prevent the system from reversing the inclination of the system. In addition, the opening degrees of the gas-water displacement valves of all the third spherical shells 604 are different, and the leveling rate and stability of the wind turbine foundation 60 can be improved.

It needs to be noted that in this text, relation terms such as first and second are only used for distinguishing one entity or operation from another entity or operation, and they do not necessarily require or imply that these entities or operations have any actual relation or sequence. In addition, “include”, “comprise” or any other variant thereof are intended to contain comprising of nonexcludability, thereby the process, the method, the commodity, or device that makes to comprise a series of key elements not only comprises those key elements, but also comprises other key elements that are not listed clearly, or be also included as the intrinsic key element of this process, method, commodity or device. Without more constraints, the key element being limited by statement “including one . . . ” doesn’t preclude, within the process, the method, the commodity, or the device that includes the described key element, there are also other identical elements.

Consequently, it is to be noted that the above-mentioned description is only illustrative of the preferred embodiments of the present disclosure, rather than to limit the scope of the present disclosure. Any modification, equivalent replacement, improvement, etc. made within the spirit and principle of the present disclosure fall within the scope of protection of the present disclosure.

What is claimed is:

1. A mud floating type offshore wind turbine system, comprising a plurality of suction anchors (10), a plurality of gravity anchors (20), an upper wind turbine (30), a tower drum (40), a tower drum connector (50) and a wind turbine foundation (60), wherein the upper wind turbine, the tower drum, the tower drum connector and the wind turbine foundation are sequentially connected in a vertical direction, the wind turbine foundation (60) comprises a hollow column body (601), a first spherical shell (602), a second spherical shell (603), a plurality of third spherical shells (604), a plurality of hollow first connecting rods (605), a plurality of second connecting rods (606) and a plurality of hollow supporting rods (607);

one end of each first connecting rod (605) is connected with a circumferential outer wall of the second spherical shell (603), the other end of each first connecting rod is connected with one third spherical shell (604), so that the plurality of third spherical shells (604) uniformly surround a circumferential direction of the second spherical shell (603), and two ends of each second connecting rod (606) are connected with every two adjacent third spherical shells (604) respectively; one end of each supporting rod (607) is connected with one third spherical shell (604), and the other end of each supporting rod is connected with a circumferential outer wall of the first spherical shell (602); each of the first spherical shell (602) and the second spherical shell (603) is internally provided with a winch with a plurality of telescopic anchor discs, each suction anchor (10) is connected with one first anchor chain (608), and the other end of each first anchor chain (608) penetrates through the corresponding third spherical shell (604) and the corresponding supporting rod (607) to be connected with the corresponding telescopic anchor disc in the first spherical shell (602); each gravity anchor (20) is connected with one second anchor chain (609), and the other end of each second anchor chain (609) penetrates through the corresponding third spherical shell (604) and the corresponding first connecting rod (605) to be connected with the corresponding telescopic anchor disc in the second spherical shell (603);

each suction anchor (10) is located beneath the corresponding third spherical shell (604), and the first anchor chains (608) are used for restraining a displacement of the upper wind turbine (30) in the vertical direction in a tensioned state; and each gravity anchor (20) is located on a side face of the corresponding third spherical shell (604), and the second anchor chains (609) are used for restraining a displacement of the upper wind turbine (30) in a horizontal direction in a tensioned state;

wherein each third spherical shell (604) comprises an inner layer, a middle layer and an outer layer, wherein the inner layer, the middle layer, and the outer layer are sequentially and coaxially arranged from inside to outside, the inner layer is used for penetrating the first anchor chain (608) or the second anchor chain (609), the middle layer comprises a plurality of first cabins (610) uniformly distributed along a circumferential direction of the third spherical shell (604), and a water inlet and a water outlet are formed in a top end and a bottom end of each first cabin (610) respectively; and the outer layer comprises a plurality of second cabins (611) uniformly distributed along a circumferential direction, and a gas-water displacement valve is arranged in each second cabin (611).

2. The mud floating type offshore wind turbine system according to claim 1, wherein each suction anchor (10) comprises a plurality of suction drums, and outer walls of the adjacent suction drums are mutually connected in an axial direction of a connection line of the center of the third spherical shell (604), the corresponding cylindrical first base (70) and the corresponding suction anchor (10).

3. The mud floating type offshore wind turbine system according to claim 2, the system further comprises a plurality of cylindrical first bases (70), wherein a semi-spherical groove is formed in a top end of each first base (70), an internal diameter of the semi-spherical groove is equal to an external diameter of the third spherical shell (604) so that the third spherical shell (604) is accommodated in the groove, a through hole is formed in a bottom center of the groove, and the through hole is configured for penetrating the first anchor chain (608) on the suction anchor (10).

4. The mud floating type offshore wind turbine system according to claim 1, wherein a skirt plate is arranged at a bottom end of each gravity anchor (20).

5. The mud floating type offshore wind turbine system according to claim 1, wherein an outer wall of each first connecting rod (605) and an outer wall of each second connecting rod (606) are each sleeved with at least one floater (90).

6. An installation method of a mud floating type offshore wind turbine system, applied to the offshore wind turbine system according to claim 1 and comprising:

setting each first anchor chain (608) and each second anchor chain (609) in a relaxed state, and lowering each gravity anchor (20) and each suction anchor (10) to a designated position of the seabed based on a ship navigation and positioning system, wherein the designated position comprises a designated depth and a designated longitude and latitude; and keeping a wind turbine foundation (60) in a balanced state, and adjusting lengths of each anchor chain (608) and each second anchor chain (609) until an upper wind turbine (30) reaches a designated working height.

7. The method according to claim 6, wherein the step of keeping a wind turbine foundation (60) in a balanced state, comprises:

acquiring an inclination angle of the wind turbine foundation (60) every first time interval; and judging whether the inclination angle is greater than a preset angle, and if yes, executing: adjusting an opening degree of a gas-water displacement valve on each third spherical shell (604) so as to keep the wind turbine foundation (60) in a steady state, wherein the opening degree of each gas-water displacement valve and a water charging and discharging rate of the corresponding third spherical shell (604) are in a directly proportional relationship.

8. The method according to claim 7, wherein the step of adjusting an opening degree of a gas-water displacement valve on each third spherical shell (604), comprises:

for each third spherical shell (604) on the upwardly inclined side, increasing the opening degree of the gas-water displacement valve on each third spherical shell (604) located on an upwards-inclined side, wherein the opening degree of the gas-water displacement valve on the third spherical shell (604) located in a middle location is the maximum, and gradually decreasing the opening degree of the gas-water displacement valve on each third spherical shell (604) in a direction away from the third spherical shell (604) located in the middle location; and increasing a water charging rate of the corresponding third spherical shell (604) by increasing the opening degree of the gas-water displacement valve.

9. The method according to claim 8, wherein the step of adjusting an opening degree of a gas-water displacement valve on each third spherical shell (604), further comprises:

for each third spherical shell (604) on the upwardly inclined side, increasing the opening degree of the gas-water displacement valve on each third spherical shell (604) located on a downwards-inclined side, wherein the opening degree of the gas-water displacement valve on the third spherical shell (604) located in a middle location is the maximum, and gradually decreasing the opening degree of the gas-water displacement valve on each third spherical shell (604) in a direction away from the third spherical shell (604) located in the middle location; and increasing a water discharging rate of the corresponding third spherical shell (604) by increasing the opening degree of the gas-water displacement valve.

10. The method of claim 6, wherein each suction anchor (10) comprises a plurality of suction drums, and outer walls of the adjacent suction drums are mutually connected in an axial direction of a connection line of the center of the third spherical shell (604), the corresponding cylindrical first base (70) and the corresponding suction anchor (10).

11. The method of claim 10, the system further comprises a plurality of cylindrical first bases (70), wherein a semi-spherical groove is formed in a top end of each first base (70), an internal diameter of the semi-spherical groove is equal to an external diameter of the third spherical shell (604) so that the third spherical shell (604) is accommodated in the groove, a through hole is formed in a bottom center of the groove, and the through hole is configured for penetrating the first anchor chain (608) on the suction anchor (10).

12. The method of claim 6, wherein a skirt plate is arranged at a bottom end of each gravity anchor (20).

13. The method of claim 6, wherein an outer wall of each first connecting rod (605) and an outer wall of each second connecting rod (606) are each sleeved with at least one floater (90).

* * * * *